United States Patent
Poulsen

(10) Patent No.: US 12,346,080 B2
(45) Date of Patent: Jul. 1, 2025

(54) METHOD FOR GENERATING INSTRUCTIONS FOR AN AUTOMATED TEXTILE CUTTER

(71) Applicant: Rodinia ApS, Copenhagen NV (DK)

(72) Inventor: Trine Young Stofberg Poulsen, Copenhagen K (DK)

(73) Assignee: Rodinia ApS, Copenhagen (DK)

(*) Notice: Subject to any disclaimer, the term of this patent is extended or adjusted under 35 U.S.C. 154(b) by 356 days.

(21) Appl. No.: 17/619,676

(22) PCT Filed: Jun. 19, 2020

(86) PCT No.: PCT/EP2020/067224
§ 371 (c)(1),
(2) Date: Dec. 16, 2021

(87) PCT Pub. No.: WO2020/254647
PCT Pub. Date: Dec. 24, 2020

(65) Prior Publication Data
US 2022/0305687 A1     Sep. 29, 2022

(30) Foreign Application Priority Data
Jun. 21, 2019  (EP) .................... 19181859

(51) Int. Cl.
G05B 19/042      (2006.01)
G05B 19/4097     (2006.01)

(52) U.S. Cl.
CPC ...... G05B 19/0426 (2013.01); G05B 19/4097 (2013.01); *G05B 2219/35162* (2013.01); *G05B 2219/45196* (2013.01)

(58) Field of Classification Search
CPC ............ G05B 19/0426; G05B 19/4097; G05B 2219/35162; G05B 2219/45196; D06H 7/00; G06Q 30/0621; G06Q 50/04
See application file for complete search history.

(56) References Cited

U.S. PATENT DOCUMENTS 3,932,942 A  *  1/1976  Ahajot ................ A41H 3/02
                                                      33/12
6,173,211 B1     1/2001  Williams et al.
(Continued)

FOREIGN PATENT DOCUMENTS

| EP | 3429949 A1 | 1/2019 |
| WO | WO 2004/010807 A1 | 2/2004 |
| WO | WO 2017/160505 A1 | 9/2017 |

OTHER PUBLICATIONS

European Patent Office; Extended European Search Report; Application No. 19181859.0-1204; EPO Form 1507N; Nov. 5, 2019; 8 pgs.

*Primary Examiner* — Chun Cao
(74) *Attorney, Agent, or Firm* — Holland & Hart LLP

(57) ABSTRACT

The invention relates to a computer implemented method for generating instructions for an automated textile cutter, including receiving one or more orders from one or more customers, the one or more orders each specifying one or more textile products comprising one or more sub-designs; and generating cutting instructions for the automated textile cutter, wherein the cutting instructions are configured to secure that the automated textile cutter leaves a connecting textile portion between at least two cut out sub-designs, when cutting according to the cutting instructions.

20 Claims, 4 Drawing Sheets

(56) References Cited

U.S. PATENT DOCUMENTS

| | | | |
|---|---|---|---|
| 9,623,578 B1 | 4/2017 | Aminpour et al. | |
| 9,782,906 B1 * | 10/2017 | Aminpour | B26D 5/005 |
| 9,868,302 B1 | 1/2018 | Aminpour | |
| 9,895,819 B1 | 2/2018 | Aminpour | |
| 2006/0015207 A1 | 1/2006 | Weiser et al. | |
| 2012/0330449 A1 * | 12/2012 | Edwards | B26D 5/005 |
| | | | 83/582 |
| 2014/0060271 A1 * | 3/2014 | Norberg Ohlsson | B24C 1/045 |
| | | | 83/13 |
| 2017/0258164 A1 | 9/2017 | Barnet et al. | |
| 2017/0259445 A1 | 9/2017 | Aminpour | |
| 2018/0181107 A1 * | 6/2018 | Jacobs, II | G05B 19/4069 |
| 2019/0021426 A1 | 1/2019 | Barnes et al. | |

\* cited by examiner

METHOD FOR GENERATING INSTRUCTIONS FOR AN AUTOMATED TEXTILE CUTTER

CROSS-REFERENCE

This application is the U.S. national phase entry of International Application Number PCT/EP2020/067224, filed 19 Jun. 2020, entitled "METHOD FOR GENERATING INSTRUCTIONS FOR AN AUTOMATED TEXTILE CUTTER," which claims the benefit of European Patent Application No. 19181859.0, filed 21 Jun. 2019, entitled "METHOD FOR GENERATING INSTRUCTIONS FOR AN AUTOMATED TEXTILE CUTTER," both of which are incorporated herein by reference for all purposes.

FIELD

This disclosure relates to a computer implemented method for generating instructions for an automated textile cutter and to a system for automated textile production.

BACKGROUND

Textile production has historically always been an extensive process involving many manual steps performed by human beings, which are very time consuming, energy consuming, and labour consuming.

Many of the products and chemicals involved in textile production can also be harmful for the environment and human beings exposed to them. Textile production has also a big impact on the environment due to the large amounts of water needed for the traditional dyeing process.

In order to make the textile production more efficient, automated factories have been developed. Such factories allow for a fast and continuous textile production with minimal need for human beings interfering in the production. The production time for textile products can be reduced considerably because of the high degree of automation of these factories. By having all the machines together in one factory all the steps in the clothes production may be performed consecutively and result in less downtime in the production.

Such factories are used for the automatic production of different type of textile products such as apparel, tablecloths, and bed linen. The textile products comprise usually several sub-designs that together when assembled or sewed together form the textile products.

The automated factories then produce the textile products by automatically printing and/or cutting the sub-design.

The cutting of the sub-designs from the textile sheet of these factories, is usually performed by an automated textile cutter. Then when the sub-designs have been cut out from the textile sheet, they must be picked up and gathered to be packed and shipped to the destination where they are to be sewed. The process of picking and sorting the sub-designs is however still challenging and time consuming.

SUMMARY

It is therefore an object of this disclosure to provide an improved automated cutting for automated textile production, as well as a more flexible and optimized automated textile production. Another object of this disclosure is to improve the logistic in automated textile production.

According to a first aspect of the present disclosure, these and further objects may be achieved by a computer implemented method for generating instructions for an automated textile cutter, where the method comprises the steps of:
receiving one or more orders from one or more customers, the one or more orders each specifying one or more textile products comprising one or more sub-designs;
generating cutting instructions for the automated textile cutter, wherein the cutting instructions are configured to secure that the automated textile cutter leaves a connecting textile portion between at least two cut out sub-designs, when cutting according to the cutting instructions.

By leaving a connecting textile portion between two cut out sub-designs, the picking of the cut out sub-designs may be facilitated, by e.g. allowing to pick up all the sub-designs of a textile product in a single operation e.g. by only having to pick one sub-design which will pull all the sub-designs connected to that sub-design with it. This contrasts with the known picking methods, where each sub-design must be identified and picked up individually either by a manual operator picking up each sub-designs manually or by an automated picker which identifies and picks up each sub-design. The method according to this disclosure provides therefore a faster collection of the sub-designs and may avoid errors related to the picking and identification of the sub-designs. This may further avoid errors related to the packing of sub-designs i.e. textile products to the customers or the recipient of the cut-out textile products. An improvement and simplification of the logistic may therefore be achieved. The automated textile cutter may be comprised in a production facility, which may also comprise an automated textile printer, an automated textile dryer, a textile roll providing or feeding the before named machines with textile sheet, an operator which may operate the machines at an operator station, and a control unit operatively coupled to the automated textile cutter and configured to generate the cutting instructions and to generate a control signal to the automated textile cutter based on the cutting instructions. Examples of automated textile printers are e.g. the Kornit Digital model Presto, the Durst model Alpha190-32, or the D-gen model Teleios Hexa. Examples of automated textile cutters are e.g. the Zund model S3 L-1600, the Bullmer model Procut, or the Gerber Technologies model Paragon LX-series.

The cutting instructions may comprise a cutting path that the automated textile cutter follows when cutting the sub-designs on the textile sheet. The cutting path may e.g. be printed on the textile sheet by the automated textile printer of the production facility before the sub-designs are to be cut by the automated textile cutter. The automated textile cutter may e.g. comprise a vision system including a camera for identifying the printed cutting path. The automated textile cutter may thereby follow the printed cutting path. Alternatively, the cutting instructions may comprise a set of coordinates that automated textile cutter can cut with respect to. In order for the automated textile cutter to have reference position, one or more reference points may be present on the textile sheet. The automated textile cutter may also e.g. be aligned with the automated textile printer such that the automated textile cutter automatically has the same reference as the automated textile printer.

In some embodiments, the one or more sub-designs comprise an information carrier. The information carrier may be printed and/or cut on the one or more sub-designs. The information carrier may be a machine readable print and/or cut, in order to be identified by the automated textile cutter and/or an automated textile picker. Alternatively, the information carrier may also be used as an analogue identifier, to be identified by a human being collecting the cut sub-designs. The information carrier may e.g. be a barcode, a number, a QR-code, an RFID chip, a reference number, or a colour code.

In some embodiments, the production facility further comprises an automated textile picker used to pick-up the cut sub-designs. Such a textile picker may also use the information carrier to identify the sub-designs before, while, or after picking them up. When the cut out connected sub-designs have been cut out, they may be picked up by the automated textile picker or by an operator and sorted easily in packing containers. A further advantage of having connecting textile portions between the sub-designs, is that the sub-designs may be stacked easily in a container and easily taken out of the container afterwards. The containers may e.g. be boxes sorting the connected sub-designs per customer, per order, per textile product, or per type of sub-design.

In some embodiments, the automated textile picker is a robotic arm comprising a gripping element for grabbing sub-designs. An example of one such robotic arm is, e.g. Universal Robots UR10e.

The automated textile picker may e.g. be configured to move in one dimension, two dimensions, or three dimensions, and e.g. be a single axis robot, a two axis robot, a three axis robot, a four axis robot, a five axis robot, or a six axis robot.

The identification of the textile products and/or sub-designs is also simplified, as only one sub-design needs to be identified in order to identify a plurality of sub-designs or a textile product. The information carrier may be comprised on each of the sub-designs, such that the automated textile picker may identify any of the sub-designs. By identifying a random sub-designs, the automated textile picker may know which sub-designs the identified sub-design is connected to. This may also reduce the time for identifying the sub-designs, since the automated textile picker may just identify the closest sub-design. Alternatively, the information carrier may be comprised on a master sub-design which may provide information to the automated textile picker about the sub-designs that the master sub-design is connected to. By having a master sub-design, fewer information carriers have to be provided on the sub-designs, and a simpler solution may thereby be achieved. The way of providing information carriers on sub-designs may e.g. depend on how the sub-designs are aggregated on the textile sheet, on how the customers want to receive their orders, or on how the sub-designs are connected to each other.

A further advantage is also that the automated textile cutter may perform the cutting of the sub-designs in a continuous cut i.e. without interrupting the cut of the automated textile cutter. The automated textile cutter may therefore perform the cutting in one run, which may allow a faster cutting. The cutting may be performed on a cutting table, where the cut out sub-designs may be picked up from.

In some embodiments, the cutting instructions are configured to secure that each sub-design is connected to another sub-design of a common textile product by a connecting textile portion, whereby a chain section of all the sub-designs of the common textile product is formed. This may allow e.g. that an automated textile picker or an operator to pick up all the sub-designs of a textile product in a single operation. A chain section may be defined by at least two sub-designs connected to each other by a connecting textile portion, and may e.g. be a chain portion of five, ten, twenty, fifty, or a hundred sub-designs. The sub-designs comprised in the chain section may also be said to be stringed together. The fact of having a connecting textile portion between sub-designs may also be called stringing.

An order may comprise one or more textile products, e.g. one or more textile products such as tee-shirts, sweaters, pants, jackets, dresses etc. The wording textile product may also be understood as a finished textile product. Example of textile products are apparel, table cloths, curtains, and bed linen. The textile products comprise one or more sub-designs, where sub-designs also may be understood as pieces of textiles that together when assembled or sewed together form the textile product i.e. the finished textile product. This may for example be the sleeve, the back, the front, and the neck of a tee-shirt or sweater. For textile products such as clothes, the textile products usually comprise several sub-designs such as the above cited pieces. However, for textile products such as bed linen, table cloths, and curtains the textile products may comprise only a few sub-designs e.g. one, two, or five sub-designs. Thereby the textile products may comprise only one sub-design. An order may thereby comprise e.g. a plurality of textile products such as towels or curtains which only include one sub-design each. The towels or curtains from a same order may thereby be connected with connecting textile portions, thereby allowing to pick up or collect substantially all the towels or curtains of a same order in a single operation. The one or more orders from the one or more customers specifying the one or more textile products preferably specify in total a plurality of textile products e.g. at least 5, 10, 20, or 50 textile products. The plurality of textile product may be a quantity of the same textile product e.g. 5, 10, 20, or 50 tee-shirts, but may also be different types of textile products such as a tee-shirt, a shirt, pants, etc.

The connecting textile portion may be understood as a piece of textile cut out from the same textile sheet than the sub-designs, which connects two sub-designs, and which is created by the automated textile cutter when performing the automatic cut of the sub-designs.

In some embodiments, the size of the connecting textile portion is determined based on a shape of the sub-designs. The connecting textile portion may for example vary proportionally with the size and shape of the sub-designs. The size of the connection portion may also vary depending on how the sub-designs are aggregated on the textile sheet, depending on how many sub-designs are connected together, or depending on the type of the fabric i.e. thinner fabric may need wider connecting textile portions to avoid breaking when pulled/picked from the cutting table. The size of the connecting textile portion may e.g. be proportional to the number of sub-designs connected together.

In some embodiments, the connecting textile portion has a length of between 0.1 cm and 5 m, preferably between 0.1 cm and 1 m, more preferably between 0.1 cm and 20 cm, most preferably between 0.5 cm and 5 cm and a width of between 0.1 cm and 50 cm, preferably between 0.3 cm and 20 cm, more preferably between 0.5 cm and 10 cm, most preferably between 1 cm and 2.5 cm.

In some embodiments, the generation of cutting instructions comprises to aggregate one or more sub-designs from one or more orders from one or more customers.

In some embodiments, the aggregation comprises to batch one or more sub-designs from one or more orders from one or more customers.

This may e.g. be understood as batching the one or more sub-designs of a common order on the same cutting instructions and thereby on the same textile roll. For example, this may be to batch all the sub-designs comprised in a shirt, such as the sleeve, the front, the back, and the neck By batching it may be understood to batch one or more sub-designs from one or more orders from one or more customers that are to be cut out from the same textile roll. The output of the batching process may be a list of sub-designs, which then are used to generate the cutting instructions for automated textile production.

In some embodiments, the aggregation of the one or more sub-designs comprises nesting of said one or more sub-designs.

On top of the batching of one or more sub-designs, the aggregation may further comprise the nesting of the batched one or more sub-designs. The batching and nesting may be performed at the processing unit, which thereby generates instructions comprising both the batching and nesting of one or more sub-designs. Alternatively, the processing unit may generate cutting instructions comprising only the batching. Then, another processing unit e.g. at the production facility may perform the nesting of the one or more sub-designs that have been batched, generating thereby subsequent cutting instructions.

By nesting it may be understood to improve the positioning of the sub-designs with respect to each other on the textile sheet when cutting with the automated textile cutter.

By nesting the one or more sub-designs, the waste of textile may be reduced by reducing the empty space between the sub-designs when printing and cutting them on the textile sheet. The nesting may be done by well-known algorithms, according to a monte-carlo simulation, or according to the paper Eunice 20 López-Camacho, Gabriela Ochoa, Hugo Terashima-Marín, Edmund K. Burke, (2013). Alternatively, the nesting may be done by customizing existing algorithms to include additional heuristics. Alternatively, the nesting may be done by machine learning aided algorithms.

When performing the nesting of the one or more sub-designs, an output of the nesting may be a reference position for each of the sub-designs, or a common reference position for a plurality of sub-designs. By indicating or assigning a reference position to the sub-designs, the automated textile printer and/or the automated textile cutter have an information that may enable to determine where the sub-designs are to be located on the textile sheet, and where to print and/or to cut the sub-designs. The reference position may be a centre position of the sub-design, but may also be an arbitrarily determined reference position of the sub-design such as a corner, a plurality of reference points, or a set of coordinates e.g. of a contour of the sub-designs. The reference position may e.g. be determined from the printing pattern to be printed on the sub-designs or the shape of the sub-design. The reference position may e.g. be indicated as an x,y coordinate. The automated textile printer and/or automated textile cutter may have a stored coordinate system, and the reference position of the sub-designs is preferably compatible with the coordinate system. The generated instructions may i.e. comprise a reference position for each aggregated sub-design. The sub-designs may be rotated in order to improve their nesting. Another output of the nesting process may therefore be an angle of rotation of the sub-designs e.g. with respect to a reference position.

The aggregation of the sub-designs and the generation of instructions may be performed by a processing unit. The processing unit may be configured to receive one or more orders from one or more customers. The processing unit disclosed may be any unit which comprises a unit able to perform basic arithmetic, such as a central processing unit (CPU) or a graphics processing unit (GPU). The processing unit may be communicatively coupled or connected to the automated textile printer and/or cutter. The processing unit may be comprised at the production facility, but may alternatively also be located remotely from the production factory and communicatively coupled to the automated textile printer and/or cutter through a network connection such as a global network as the internet and e.g. as a cloud. The processing unit may also have access to or comprise a data storing unit such as a database comprising e.g. the textile references of the textile rolls, customer profiles, printing patterns, printing files, and customer orders.

The sub-designs should therefore preferably be nested such that the distance between the sub-designs are minimized and thereby also minimizing the dimensions of the connecting textile portions. The radius to the next sub-design should e.g. preferably be within a specific interval such that the dimensions of the connecting textile portions are kept within the above preferred intervals. The nesting may e.g. be improved with regard to both minimizing the textile waste and the dimension of the connecting textile portion. The sub-designs may also under the nesting process be oriented such that the positioning of the sub-designs with respect to each other is improved. The connecting textile portion may be said to comprise at least two connection points, one on each of a first and a second sub-design, respectively. These two connection points may thereby also be improved with the positioning of the sub-designs.

In some embodiments, a plurality of first sub-designs are connected to form a first chain section of all the first sub-designs of a first textile product on a first common area of a textile sheet, and a plurality of second sub-designs are connected to form a second chain section of all the second sub-designs of a second textile product on a second common area of a textile sheet. This may e.g. avoid that sub-designs from different textile products are positioned such that the connecting textile portions between sub-designs of a shirt and the connecting textile portions between sub-designs of pants get entangled in each other when an automated textile picker is picking up e.g. a sub-design of the shirt. Preferably, only one chain section is picked up at once.

In some embodiments, the cutting instructions are configured to secure that at least 5%, 10%, 25%, 50% of all the sub-designs of a common order are connected to each other, where at least 2, 4, 6, 10, 20 sub-designs of a common order are connected to each other.

In some situations, it may be advantageous to collect a plurality of sub-designs of a common order by connecting them with connecting textile portions. Some customers may e.g. prefer to get the cut-out sub-designs collected in bigger portions than just collected by a single textile product. This may further facilitate the packing of the textile products.

In some embodiments, the cutting instructions are configured to secure that at least 5%. 10%, 25%, 50% of all the sub-designs of a common type are connected to each other, where at least 2, 4, 6, 10, 20 sub-designs of a common type are connected to each other. This may e.g. be all the sleeves that are connected to each other by connecting textile portions, all the necks, etc. Again some customers may e.g. prefer to get the cut out sub-designs collected in bigger portions of the same type of sub-designs.

This may provide a more efficient and more flexible automated textile production, where the customers also have the flexibility to choose how to receive the produced orders.

According to a second aspect, the present disclosure relates to a system for automated textile production comprising an automated textile cutter and a control unit operatively coupled to the automated textile cutter which is configured to obtain cutting instructions generated according to a first aspect of the disclosure.

In some embodiments, the system further comprises an automated textile picker configured to pick up the cut sub-designs.

In some embodiments, the picking is performed based on the shape of the sub-designs.

According to a third aspect, the present disclosure relates to a method for producing a textile product automatically using a system according to the second aspect of the disclosure.

In some embodiments, the method further comprises the steps of:
cutting the one or more sub-designs according to the cutting instructions with an automated textile cutter;
cutting off the one or more connecting textile portions such that the one or more sub-designs are separated from each other;
assembling the cut one or more sub-designs into the textile product.

The assembling step of the cut one or more sub-designs into the textile product may be performed at the production facility or alternatively another facility where the assembling is done. The assembling may be performed by a seamstress, tailor, or dressmaker.

According to a fourth aspect, the present disclosure relates to a textile product produced by using the method according to the third aspect of the disclosure.

BRIEF DESCRIPTION OF THE DRAWINGS

The above and/or additional objects, features and advantages of the present disclosure will be further elucidated by the following illustrative and non-limiting detailed description of examples, with reference to the appended drawings, wherein.

DETAILED DESCRIPTION

In the following description reference is made to the accompanying figures, which show by way of illustration how the principles of this disclosure may be practiced.

Figure 1:
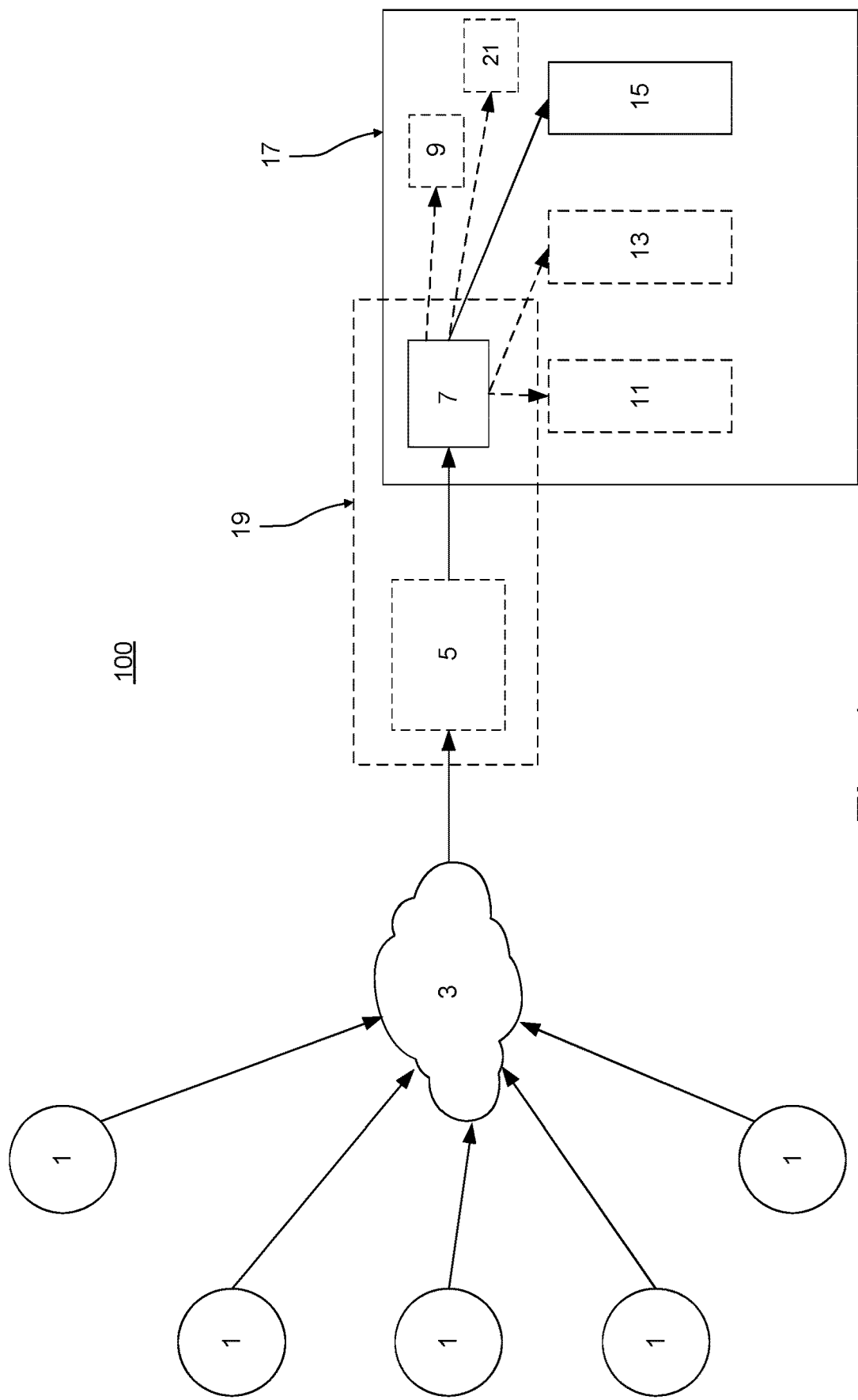
FIG. 1 shows a block diagram representing an example of a system for automated textile production, according to an aspect of the disclosure.

FIG. 1 shows a block diagram of a system 100 for automated textile production comprising a production facility 17 including an automated textile cutter 15, and optionally an automated textile printer 11, the system 100 further comprising a control unit 7 being configured to receive one or more orders 1 from one or more customers, the one or more orders 1 each specifying one or more textile products comprising one or more sub-designs, said control unit 7 being further configured to obtain cutting instructions for the automated textile cutter 15, wherein the cutting instructions are configured to secure that the automated textile cutter 15 leaves a connecting textile portion between at least two cut out sub-designs, when cutting according to the cutting instructions, and a control unit 7 operatively coupled to the automated textile cutter 15. The control unit is further configured to generate a control signal to the automated textile cutter 15 based on the instructions. In this exemplifying representation, the one or more orders 1 are optionally obtained by a processing unit 5 through a network 3. This network 3 may e.g. be a global network as the internet and e.g. as a cloud. Alternatively, the network 3 may also be a local network at the production facility 17.

Optionally, the processing unit 5 and the control unit 7 are comprised in a common device 19 as indicated by the dotted line, whereby the cutting instructions are generated at that common device 19, such that the processing unit 5 also acts as control device 7 or conversely that the control device 7 also acts as the processing unit 5.

In an alternative embodiment, the processing unit 5 is comprised at the production facility 17 e.g. as an independent processing unit or as a common device with the control unit, but may alternatively also be located remotely from the production facility 17 and communicatively coupled to the automated textile cutter 15 through a network connection such as a global network as the internet and e.g. as a cloud.

Optionally, an automated textile dryer 13 is comprised in the production facility 17 after the automated textile printer 11 and before the automated textile cutter 15. The textile sheet that has been printed by the automated textile printer 11 is then preferably automatically conveyed to the automated textile dryer 13 in order to cure the printed textile. The textile sheet may then preferably be automatically conveyed to the automated textile cutter 15. Optionally, an operator 9 can transfer manually the textile sheet from the automated textile printer 11 to the automated textile dryer 13 or the automated textile cutter 15, or from the automated textile printer 11 to the automated textile cutter 15.

Optionally, an automated textile picker 21 is comprised in the production facility 17, preferably next to, partially integrated, or fully integrated with the automated textile cutter 15. The automated textile picker 21 is configured to pick up the cut sub-designs after being cut by the automated textile cutter 15.

Figure 2:
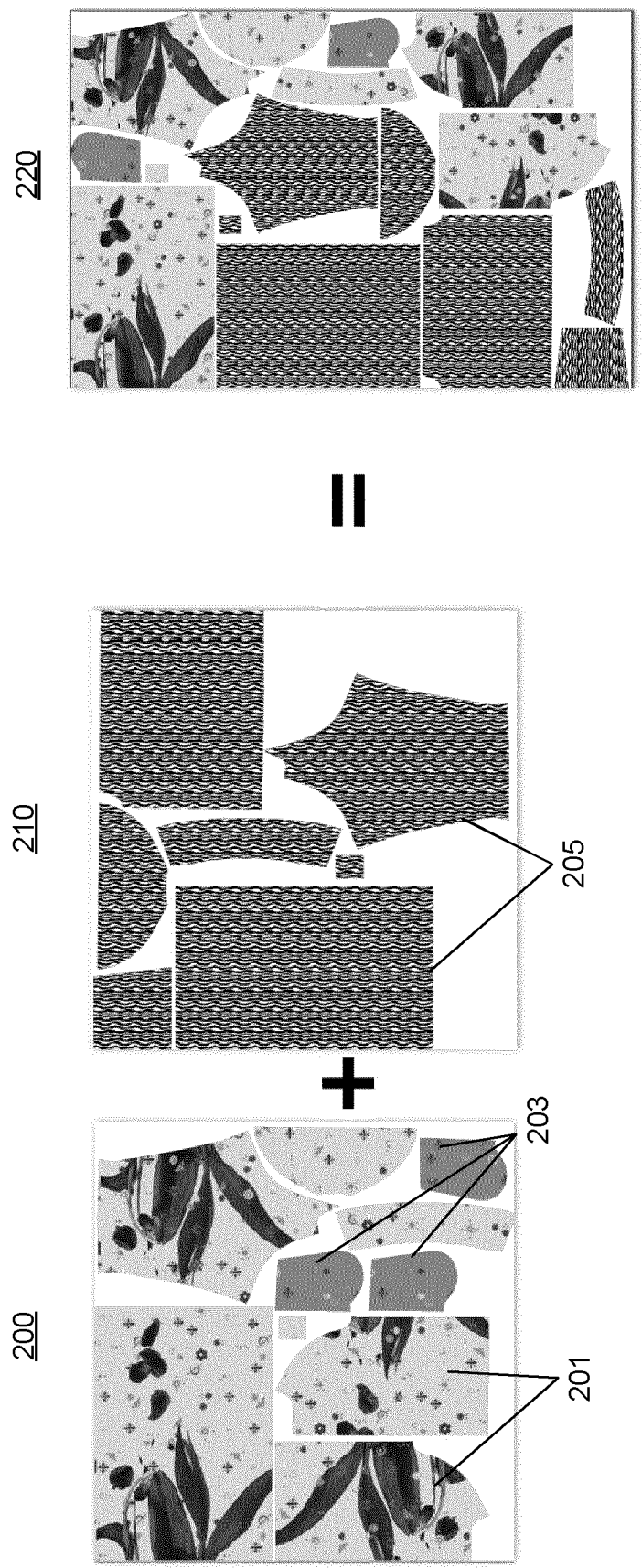
FIG. 2 shows an example of the aggregation of one or more orders from one or more customers.

Optionally, the processing unit 5 or the control unit 7 generates operator instructions to an operator 9 at the facility 17. An example of an operator instruction may e.g. be to instruct the operator 9 to transfer the textile sheet from one machine to another, to change the textile roll in the automated textile printer 11, to start or to stop a printing or cutting process, or to perform a maintenance operation on the automated textile printer 11, automated textile dryer 13, or automated textile cutter 15. The operator instruction may also be to pick up the cut out sub-designs, FIG. 2 shows an example of the aggregation of one or more orders 200 and 210 received from one or more customers. As can be seen, order 200 comprises two textile products 201 and 203, comprising respectively seven sub-designs and three sub-designs. Order 210 comprises one textile product 205 comprising seven sub-designs. Here the aggregation comprises both the batching of one or more sub-designs and the nesting of one or more sub-designs. The two orders 200 and 210 comprising in total three textile products, which themselves comprise a plurality of sub-designs that are batched and nested. The output of the batching and nesting can be seen in 220.

Figure 3:
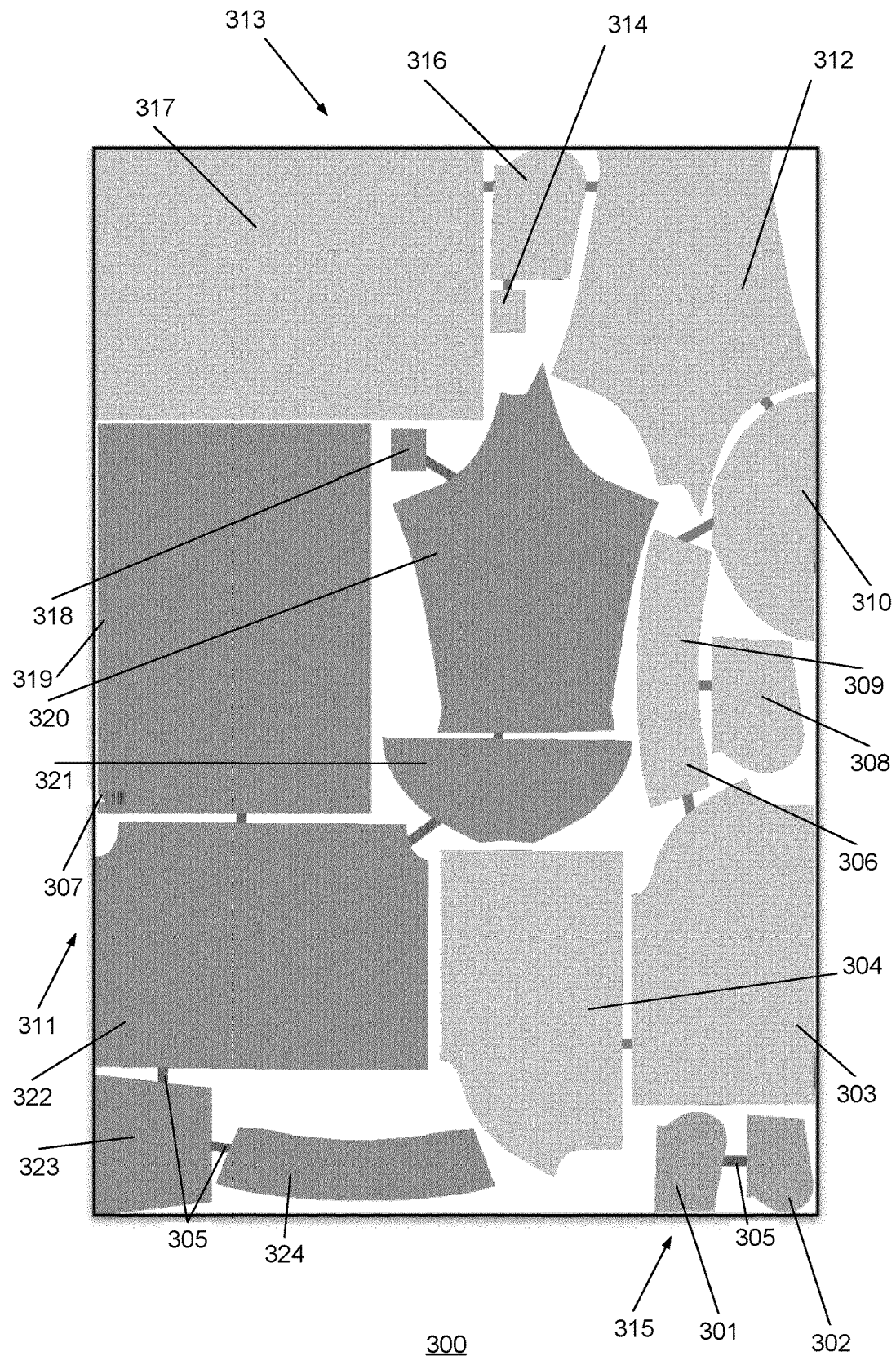
FIG. 3 shows an example of cutting instructions for an automated textile cutter.

FIG. 3 shows an example of generated cutting instructions 300 for an automated textile cutter. The cutting instructions 300 comprise the aggregation which comprises here both the batching of one or more sub-designs and the nesting of one or more sub-designs. The cutting instructions comprise three textile products 311, 313, and 315. Here textile product 311 comprises seven sub-designs 318, 319, 320, 321, 322, 323, 324 which are connected with connecting textile portions 305. Textile product 313 comprises nine sub-designs 303, 304, 306, 308, 309, 310, 312, 314, 316, and 317 which are connected with connecting textile portions 305. Textile product 315 comprises two sub-designs 301 and 302 which are connected with a connecting textile portion 305. Optionally, the one or more sub-designs 309 comprise an information carrier 307. In this example the information carrier is represented as a barcode 307.

Figure 4:
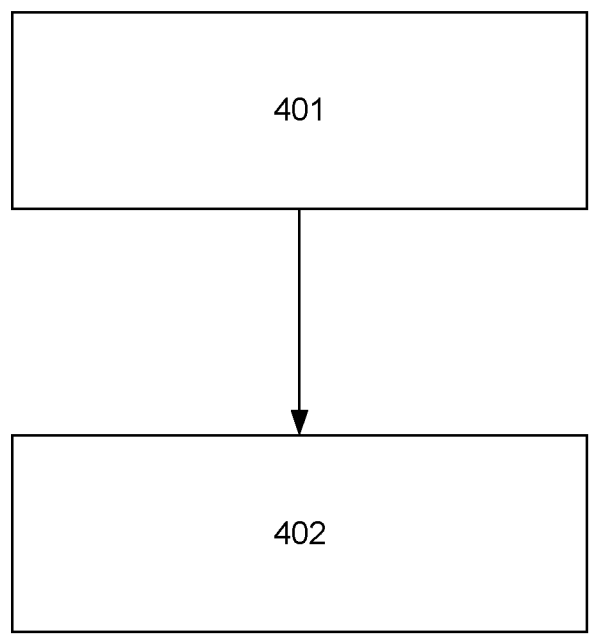
FIG. 4 shows a flow chart of a method for generating instructions for an automated textile cutter, according to an aspect of the disclosure.

FIG. 4 shows a flow chart of a method for generating instructions for an automated textile cutter, where the method comprises the steps of receiving 401 one or more orders from one or more customers, the one or more orders each specifying one or more textile products comprising one or more sub-designs and generating 402 cutting instructions for the automated textile cutter, wherein the cutting instructions are configured to secure that the automated textile cutter leaves a connecting textile portion between at least two cut out sub-designs, when cutting according to the cutting instructions.

Although some embodiments have been described and shown in detail, the present disclosure is not restricted to them, but may also be embodied in other ways within the scope of the subject matter defined in the following claims. In particular, it is to be understood that other embodiments may be utilised and structural and functional modifications may be made without departing from the scope of the present disclosure.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

What is claimed is:

1. A computer implemented method for generating instructions for an automated textile cutter for cutting out a plurality of sub-designs from a textile sheet, wherein the method comprises:
   receiving, using a processing unit, one or more orders from one or more customers, the one or more orders each specifying at least one textile product comprising the plurality of sub-designs; and
   generating, using the processing unit, cutting instructions for the automated textile cutter, wherein the cutting instructions are configured to secure that the automated textile cutter separates the plurality of sub-designs from the textile sheet while leaving a connecting textile portion between at least two cut out sub-designs when cutting according to the cutting instructions, and wherein the at least two cut out sub-designs connected by the connecting textile portion are removable from the textile sheet without breaking the connecting textile portion between the at least two cut out sub-designs.

2. The method according to claim 1, wherein the cutting instructions are configured to secure that each sub-design is connected to another sub-design of a common textile product by a connecting textile portion, whereby a chain section of all the sub-designs of the common textile product is formed.

3. The method according to claim 1, wherein the generated cutting instructions comprise instructions to aggregate one or more sub-designs from one or more orders from one or more customers.

4. The method according to claim 3, wherein the aggregation comprises batching one or more sub-designs from one or more orders from one or more customers.

5. The method according to claim 1, wherein a plurality of first sub-designs are connected to form a first chain section of all the first sub-designs of a first textile product on a first common area of a textile sheet, and a plurality of second sub-designs are connected to form a second chain section of all the second sub-designs of a second textile product on a second common area of a textile sheet.

6. The method according to claim 1, wherein the cutting instructions are configured to secure that at least 5%, 10%, 25%, or 50% of all the sub-designs of a common order are connected to each other.

7. The method according to claim 1, wherein the cutting instructions are configured to secure that at least 5%, 10%, 25%, or 50% of all the sub-designs of a common order of a common type are connected to each other.

8. The method according to claim 1, wherein a size of the connecting textile portion is determined based on a shape of the sub-designs.

9. The method according to claim 1, wherein the connecting textile portion has a length of between 0.1 cm and 5 m, and a width of between 0.1 cm and 50 cm.

10. A system for automated textile production for cutting out a plurality of sub-designs from a textile sheet, comprising:
    an automated textile cutter; and
    a control unit operatively coupled to the automated textile cutter, wherein the control unit is configured to obtain cutting instructions generated by:
       receiving, using a processing unit, one or more orders from one or more customers, the one or more orders each specifying at least one textile product comprising the plurality of sub-designs; and
       generating, using the processing unit, cutting instructions for the automated textile cutter, wherein the cutting instructions are configured to secure that the automated textile cutter separates the plurality of sub-designs from the textile sheet while leaving a connecting textile portion between at least two cut out sub-designs when cutting according to the cutting instructions, and wherein the at least two cut out sub-designs connected by the connecting textile portion are removable from the textile sheet without breaking the connecting textile portion between the at least two cut out sub-designs.

11. The system according to claim 10, wherein the control unit is further configured to generate a control signal to the automated textile cutter based on the obtained cutting instructions.

12. The system according to claim 10, wherein the system further comprises an automated textile picker configured to pick up the cut sub-designs.

13. The system according to claim 12, wherein picking up the cut sub-designs is performed based on the shape of the one or more sub-designs.

14. A method for producing a textile product automatically using a system for automated textile production comprising an automated textile cutter and a control unit operatively coupled to the automated textile cutter for cutting out a plurality of sub-designs from a textile sheet, comprising:

obtaining, using a processing unit, cutting instructions for the automated textile cutter, wherein the cutting instructions are configured to secure that the automated textile cutter separates the plurality of sub-designs from the textile sheet while leaving a connecting textile portion between at least two cut out sub-designs when cutting according to the cutting instructions, wherein the at least two cut out sub-designs correspond to one or more textile products, and wherein the at least two cut out sub-designs connected by the connecting textile portion are removable from the textile sheet without breaking the connecting textile portion between the at least two cut out sub-designs; and operating, using the processing unit, the automated textile cutter according to the cutting instructions such that the automated textile cutter leaves a connecting textile portion between at least two cut out sub-designs when cutting according to the cutting instructions.

15. The method according to claim 14, further comprising:

cutting off the one or more connecting textile portions such that the one or more of the sub-designs are separated from each other; and assembling the cut one or more sub-designs into the textile product.

16. A textile product produced by using a method for automated textile production comprising:

obtaining cutting instructions for an automated textile cutter, wherein the cutting instructions are configured to secure that the automated textile cutter leaves a connecting portion between at least two cut out sub-designs when cutting according to the cutting instructions, wherein the at least two cut out sub-designs correspond to one or more textile products; and operating the automated textile cutter according to the cutting instructions such that the automated textile cutter leaves a connecting textile portion between at least two cut out sub-designs when cutting according to the cutting instructions, wherein the at least two cut out sub-designs connected by the connecting textile portion are removable from a textile sheet without breaking the connecting textile portion between the at least two cut out sub-designs.

17. The method according to claim 1, wherein the cutting instructions are configured to secure that the automated textile cutter separates the plurality of sub-designs from the textile sheet using a continuous cut in one run while leaving the connecting textile portion between the at least two cut out sub-designs when cutting according to the cutting instructions.

18. The system according to claim 10, wherein the cutting instructions are configured to secure that the automated textile cutter separates the plurality of sub-designs from the textile sheet using a continuous cut in one run while leaving the connecting textile portion between the at least two cut out sub-designs when cutting according to the cutting instructions.

19. The method according to claim 14, wherein the cutting instructions are configured to secure that the automated textile cutter separates the plurality of sub-designs from the textile sheet using a continuous cut in one run while leaving the connecting textile portion between the at least two cut out sub-designs when cutting according to the cutting instructions.

20. The method according to claim 16, wherein the cutting instructions are configured to secure that the automated textile cutter separates the at least two cut out sub-designs from the textile sheet using a continuous cut in one run while leaving the connecting textile portion between the at least two cut out sub-designs when cutting according to the cutting instructions.

* * * * *